(12) United States Patent
Zimmanck

(10) Patent No.: US 9,444,355 B2
(45) Date of Patent: Sep. 13, 2016

(54) METHOD AND APPARATUS FOR DETERMINING A BRIDGE MODE FOR POWER CONVERSION

(71) Applicant: Enphase Energy, Inc., Petaluma, CA (US)

(72) Inventor: Donald Richard Zimmanck, Petaluma, CA (US)

(73) Assignee: Enphase Energy, Inc., Petaluma, CA (US)

(*) Notice: Subject to any disclaimer, the term of this patent is extended or adjusted under 35 U.S.C. 154(b) by 43 days.

(21) Appl. No.: 14/208,549

(22) Filed: Mar. 13, 2014

(65) Prior Publication Data

US 2014/0268897 A1    Sep. 18, 2014

Related U.S. Application Data

(60) Provisional application No. 61/783,583, filed on Mar. 14, 2013.

(51) Int. Cl.
*H02M 3/335* (2006.01)
*H02M 1/00* (2006.01)

(52) U.S. Cl.
CPC ....... *H02M 3/3353* (2013.01); *H02M 3/33576* (2013.01); *H02M 2001/0058* (2013.01); *Y02B 70/1433* (2013.01); *Y02B 70/1491* (2013.01)

(58) Field of Classification Search
CPC .................................................. H02M 3/335
USPC ...................... 363/17, 21.02–21.18
See application file for complete search history.

(56) References Cited

U.S. PATENT DOCUMENTS

| | | |
|---|---|---|
| 2009/0034299 A1* | 2/2009 | Lev .................................. 363/17 |
| 2009/0290389 A1 | 11/2009 | Ueno et al. |
| 2011/0242854 A1* | 10/2011 | Minami et al. ................. 363/17 |
| 2012/0020137 A1* | 1/2012 | Abe .............................. 363/132 |
| 2012/0063177 A1* | 3/2012 | Garrity .......................... 363/37 |
| 2012/0294045 A1 | 11/2012 | Fornage et al. |
| 2013/0043849 A1* | 2/2013 | Pagano ........................ 323/271 |

FOREIGN PATENT DOCUMENTS

| | | |
|---|---|---|
| EP | 1973220 A1 | 9/2008 |
| JP | 2002096167 A | 4/2002 |
| JP | 2003324956 A | 11/2003 |

OTHER PUBLICATIONS

PCT International Search Report and Written Opinion Mailed on Jul. 21, 2014 for International Application No. PCT/US2014/025706, 11 Pages.

(Continued)

*Primary Examiner* — Jeffrey Gblende
*Assistant Examiner* — Trinh Dang
(74) *Attorney, Agent, or Firm* — Moser Taboada

(57) ABSTRACT

A method and apparatus for controlling power conversion. In one embodiment, the method comprises computing a ratio based on both voltage and charge pertaining to power conversion in a resonant converter; comparing the ratio to a threshold; and controlling, independent of switching frequency of the resonant converter, power output from the resonant converter based on whether the ratio satisfies the threshold.

17 Claims, 4 Drawing Sheets

(56) References Cited

OTHER PUBLICATIONS

Liang, "High Efficiency Distributed Solar Energy Conversion Techniques", 221 Pages, Oct. 27, 2011, Dissertation submitted to the Graduate Faculty of North Carolina State University, http://repository.lib.ncsu.edu/ir/bitstream/1840.16/7349/1/etd.pdf.

* cited by examiner

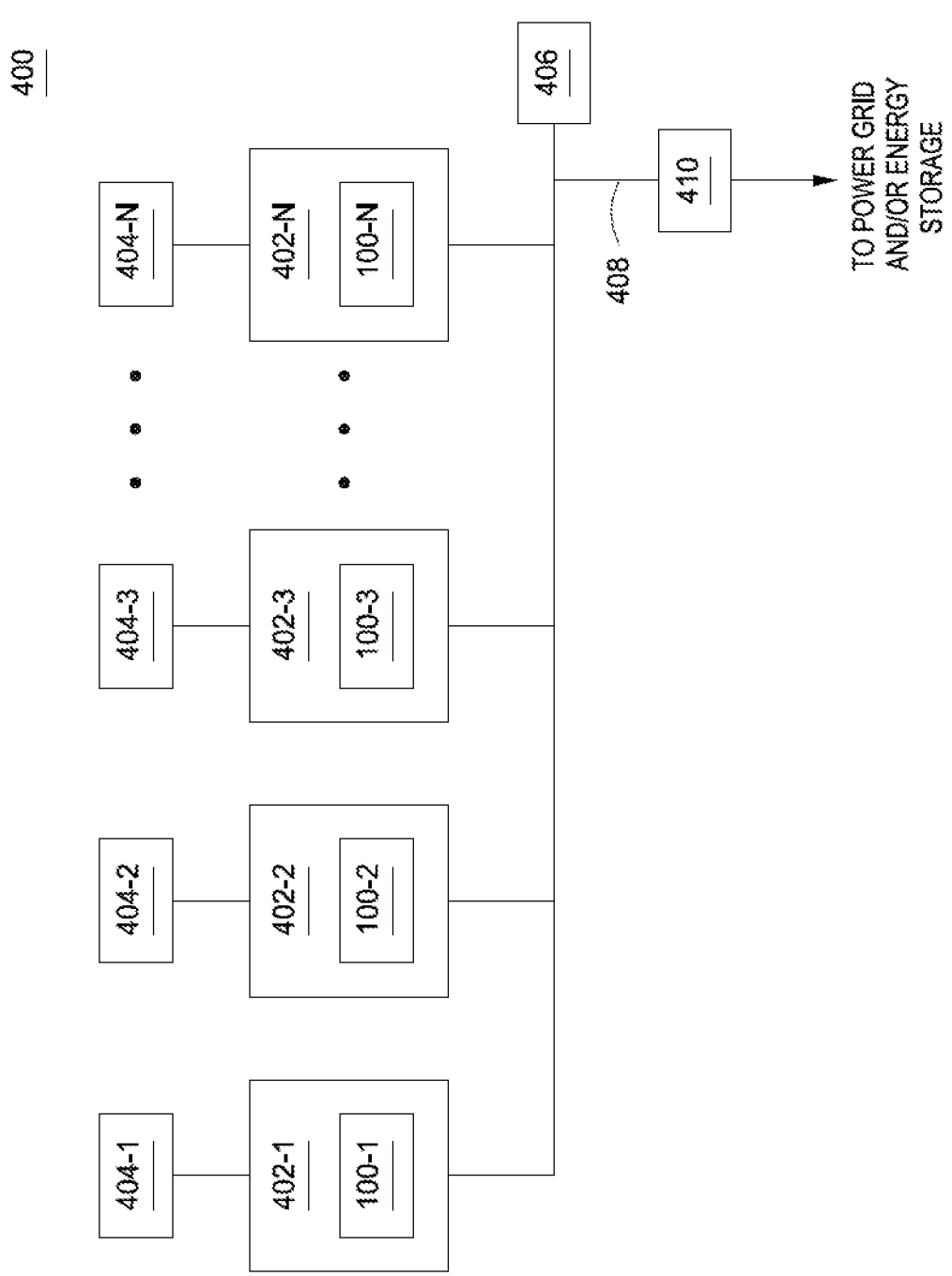

METHOD AND APPARATUS FOR DETERMINING A BRIDGE MODE FOR POWER CONVERSION

CROSS-REFERENCE TO RELATED APPLICATIONS

This application claims benefit of U.S. provisional patent application Ser. No. 61/783,583, entitled "Method and Apparatus for Determining a Bridge Mode for Power Conversion" and filed Mar. 14, 2013, which is herein incorporated in its entirety by reference.

BACKGROUND OF THE INVENTION

1. Field of the Invention

Embodiments of the present disclosure relate generally to power conversion, and, in particular, to dynamically determining when to use a full-bridge mode or half-bridge mode in a resonant converter.

2. Description of the Related Art

Resonant converters provide many advantages over other types of power converters. Such advantages may include low noise, low component stress, low component count, and predictable conduction-dominated losses. Resonant converters may therefore be smaller, less costly, and more efficient devices than other types of converters.

In some resonant converters, a full H-bridge converts a DC input voltage to a square wave voltage as an input to a resonant tank. Generally, the H-bridge is operated at or proximate the resonant frequency of the tank. However, changes in available input voltage and/or output voltage requirements for the converter may require that the H-bridge operating frequency be shifted away from the resonant frequency to control the converter's output power flow. As the operating frequency increases, switching losses for the H-bridge switches increase and reduce the efficiency of the converter.

Therefore, there is a need in the art for a method and apparatus for efficiently controlling the output power of a resonant converter.

SUMMARY OF THE INVENTION

Embodiments of the present invention generally relate to a method and apparatus for determining an input bridge operating mode substantially as shown and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 is a block diagram of a system for power conversion using one or more embodiments of the present invention.

DETAILED DESCRIPTION

Figure 1:
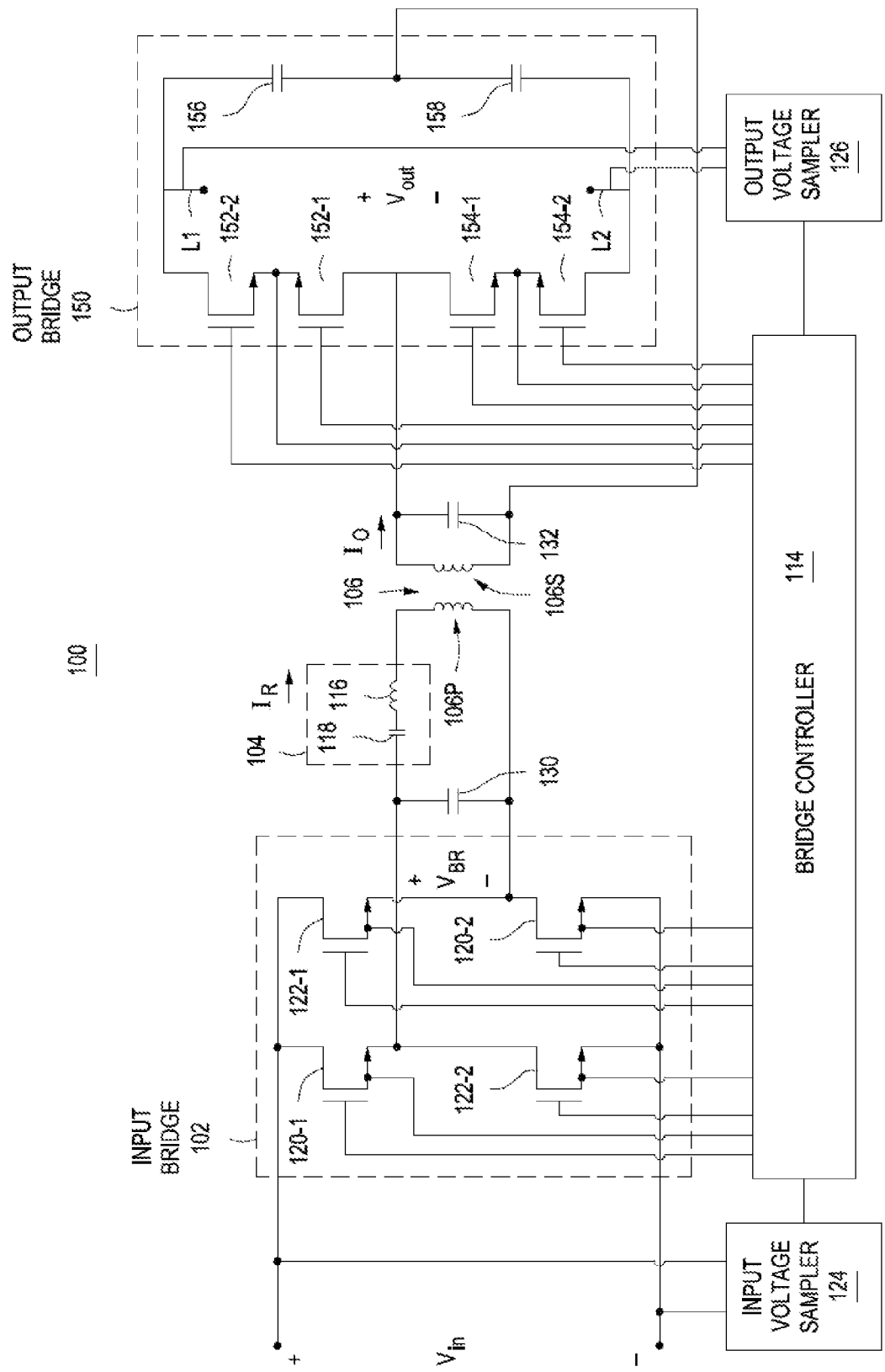
FIG. 1 is a block diagram of a resonant converter in accordance with one or more embodiments of the present invention.

FIG. 1 is a block diagram of a resonant converter 100 in accordance with one or more embodiments of the present invention. This diagram only portrays one variation of the myriad of possible system configurations. The present invention can function in a variety of power generation environments and systems.

The resonant converter 100 is a DC-AC converter that comprises an input bridge 102 coupled across a parallel input capacitor 130 and across a series combination of a capacitor 118, an inductor 116, and a primary winding 106$p$ of a transformer 106 having a 1:n turns ratio. In some embodiments, at least a portion of the capacitance of the parallel input capacitor 130 may be due to parasitic capacitance from switching devices within the resonant converter 100.

The input bridge 102 is a full H-bridge comprising switches 120-1, 120-2, 122-1, and 122-2 (e.g., n-type metal-oxide-semiconductor field-effect transistors, or MOSFETs) arranged such that switches 120-1/120-2 and 122-1/122-2 form first and second diagonals, respectively, of the H-bridge. Gate terminals and source terminals of each of the switches 120-1, 120-2, 122-1, and 122-2 are coupled to a bridge controller 114 for operatively controlling the switches. In other embodiments, the switches 120-1, 120-2, 122-1, and 122-2 may be any other suitable electronic switch, such as insulated gate bipolar transistors (IGBTs), bipolar junction transistors (BJTs), p-type MOSFETs, gate turnoff thyristors (GTOs), and the like.

A first output terminal of the bridge 102 is coupled between the switches 120-1 and 122-2, and is also coupled to a first terminal of the capacitor 118. A second terminal of the capacitor 118 is coupled to a first terminal of the inductor 116, and a second terminal of the inductor 116 is coupled to a first terminal of the primary winding 106P. The inductor 116 and the capacitor 118 form a series resonant circuit 104 (also referred to as a "tank 104") having a resonant frequency at or close to, in some embodiments, 100 kilohertz (kHz); for example, the inductor 116 may be a 5 microhenry (uH) inductor and the capacitor 118 may be a 500 nanofarad (nF) capacitor. In other embodiments, the resonant circuit 104 may have a different resonant frequency. In some alternative embodiments, the inductor 116 may represent a leakage inductance of the transformer 106 rather than being a separate inductor, thereby reducing the overall component count of the resonant converter 100. In other alternative embodiments, other types of resonant circuits (e.g., series LC, parallel LC, series-parallel LLC, series-parallel LCC, series-parallel LLCC, and the like) may be utilized within the resonant converter 100.

A second terminal of the primary winding 106$p$ is coupled between the switches 122-1 and 120-2 to a second output terminal of the input bridge 102. Additionally, an input voltage sampler 124 is coupled across the input terminals of the input bridge 102 and also to the bridge controller 114.

The input bridge 102 generally operates at a switching frequency of 100 kilohertz (kHz)—i.e., the resonant frequency of the resonant circuit 104—and is able to switch, for example, from 60 to 600 volts depending upon the DC voltage source to the bridge. In other embodiments, the bridge 102 may operate at a different switching frequency, for example a switching frequency of 200 kHz.

On the secondary side of the transformer 106, a parallel output capacitor 132 and an output bridge 150 are each coupled across a secondary winding 106s of the transformer 106. The output bridge 150 is configured as a half-bridge and comprises switches 152-1, 152-2, 154-1, and 154-2, although in other embodiments the output bridge 150 may be a full-bridge. Drain terminals of the switches 152-1 and 154-1 are coupled to a first terminal of the capacitor 132. Source terminals of each switch pair 152-1/152-2 and 154-1/154-2 are coupled together (i.e., the source terminals of switches 152-1/152-2 are coupled together, and the source terminals of switches 154-1/154-2 are coupled together). Drain terminals of the switches 152-2 and 154-2 are coupled to first and second output terminals L1 and L2, respectively, and a series combination of capacitors 156 and 158 is coupled across the output terminals L1 and L2. The switch pair 154-1/154-2 form a first four-quadrant switch (i.e., a fully bi-directional switch), and the switch pair 152-1/152-2 form a second four-quadrant switch. In some embodiments, the switches 152-1, 152-2, 154-1, and 154-2 may be n-type MOSFET switches; in other embodiments, other suitable switches and/or arrangements of switches may be utilized for the first, the second, and the third four-quadrant switches. In some alternative embodiments, the output bridge 150 may be replaced by a rectification circuit and the resonant converter 100 generates a DC output.

Gate and source terminals of each switch 152-1, 152-2, 154-1, and 154-2 are coupled to the controller 114 for operating the switches, and an output voltage sampler 126 is coupled across the output terminals L1 and L2 for measuring a generated voltage Vout. The output terminals L1 and L2 may be coupled to an AC line, such as an AC commercial power grid, for coupling a single-phase AC voltage to the AC line. Through design selection of both the parallel input capacitor 130 and the parallel output capacitor 132, the resonant converter 100 can be designed such that it modulates over a wide range of power with a relatively small change in switching frequency of the bridge 102. In one or more alternative embodiments, the output bridge 150 comprises additional switches such that two or three phases of AC power may be generated.

In some embodiments, the capacitor 118 may be on the order of 400 nanofarads (nF), the inductor 116 may be on the order of 4 microhenries (µH), the parallel input capacitor 130 may be on the order of 10 nF, the parallel output capacitor 132 may be on the order of 1-5 nF, and the transformer 106 may have a turns ratio of 1:6; such embodiments may have a frequency range of 150 kilohertz (kHz)—300 kHz. Generally, the series capacitance of the resonant circuit 104 may be on the order of 400 nF.

During operation, the input bridge 102 receives an input voltage Vin from a DC voltage source, such as one or more renewable energy sources (e.g., photovoltaic (PV) modules, wind farms, hydroelectric systems, or the like), batteries, or any suitable source of DC power. In full-bridge mode, the bridge controller 114 operates the input bridge 102 (i.e., alternately activates/deactivates the bridge diagonals 180° out of phase) at a frequency on the order of 100 kHz to generate a bridge output voltage Vbr that is a bipolar square wave. The bridge output voltage Vbr results in a current Ir through the resonant circuit 104 and the primary winding 106p, thereby inducing an alternating current in the secondary winding 106s. The transformer 106 may be a step-up transformer for increasing the voltage from the primary to the secondary (for example, for a DC input generated by a PV module, the transformer 106 would generally be a step-up transformer) or, alternatively, a step-down transformer for decreasing the voltage. The type of transformer depends on the application for the power converter; for example, for a renewable application where the DC input is generated by one photovoltaic (PV) module and the output is an AC mains (grid) type voltage, a typical turns ratio would be 1:6.

Alternatively, the converter 100 can also operate in a half-bridge mode. When operating in half-bridge mode, the input bridge 102 is effectively operated as a half H-bridge by, for example, deactivating switch 122-1 (i.e., putting the switch 122-1 into an open conduction state so that the switch 122-1 is "off"), activating the switch 120-2 (i.e., putting the switch 120-2 into a closed conduction state so that the switch 120-2 is "on"), and alternately operating the switches 120-1 and 122-2 based on the current switching frequency; alternatively, other combinations of switches within the input bridge 102 may be suitably activated/deactivated to achieve the half H-bridge operation.

The secondary winding 106s generates an approximately sinusoidal current waveform Io at the frequency of approximately 100 kHz (i.e., the input bridge frequency), which then flows into the output bridge 150 to generate the output voltage Vout. The amplitude of the current waveform Io, and hence the output power generated by the resonant converter 100, is determined by the switching frequency of the bridge 102 and can be increased or decreased by suitably adjusting the switching frequency of the input bridge 102; i.e., the current (and power) transferred to the output terminals (Vout) varies as the signal frequency moves away from the resonant frequency of the resonant circuit 104.

The bridge controller 114 operates the input bridge switches (i.e., switches 120-1, 120-2, 122-1, and 122-2) and the output bridge switches (i.e., switches 152-1, 152-2, 154-1 and 154-2) such that a desired output power is generated by the resonant converter 100. In some embodiments where the resonant converter 100 receives input power from a PV module, the bridge controller 114 may operate the switches such that the PV module is biased at a maximum power point (MPP).

The input voltage sampler 124 samples the input voltage Vin and generates values indicative of the sampled input voltage ("input voltage samples"), while the output voltage sampler 126 samples the output voltage Vout and generates values indicative of the sampled output voltage ("output voltage samples"). In some embodiments, the input voltage sampler 124 and the output voltage sampler 126 may perform such sampling at rates of 1 kHz and 50 kHz, respectively. In some embodiments, the input voltage sampler 124 and the output voltage sampler 126 each comprise an analog-to-digital converter (ADC) for generating the samples in a digital format.

The input voltage sampler 124 and the output voltage sampler 126 respectively couple the input and output voltage samples to the bridge controller 114. In accordance with one or more embodiments of the present invention, the bridge controller 114 dynamically determines an operating mode for the input bridge 102—i.e., whether to operate the input bridge 102 in a full-bridge mode or a half-bridge mode— based on both voltage and charge. In order to determine whether to operate the input bridge 102 as a full-bridge or a half-bridge, the bridge controller 114 computes the following voltage-and-charge-based ratio:

$$(Q1+2Qp1)/(Q2+2Qp2) \tag{1}$$

where $Q1=Q2*V2/V1$=normalized charge transferred from or into the input bridge 102 every switching cycle (in coulombs); $Q2=Q1*V1/V2$=normalized charge transferred from or into the output bridge 150 every switching cycle (in coulombs); V1=normalized input voltage (i.e., in the embodiment described herein V1=Vin as the voltage is normalized to the primary); V2=normalized output voltage (i.e., Vout/n); Qp1=normalized charge required to zero-voltage switch (ZVS) the input bridge 102; and Qp2=normalized charge required to ZVS the output bridge 150.

The bridge controller 114 then compares the computed ratio to a threshold, which is generally on the order of 1.0. If the ratio is less than the threshold, the input bridge 102 is operated in half-bridge mode; if the ratio is greater than the threshold, the input bridge 102 is operated in full-bridge mode. If the ratio is equal to the threshold, in some embodiments the input bridge 102 may be operated in full-bridge mode, while in other embodiments it may be operated in half-bridge mode. In an embodiment where both Qp1 and Qp2 are equal to zero, the decision on whether to operate in full-bridge or half-bridge mode is based on the ratio V2/V1, for example as described in detail in co-pending, commonly assigned U.S. patent application Ser. No. 13/475,460, entitled "Method and Apparatus for Controlling Resonant Converter Output Power", filed May 18, 2012, which is herein incorporated in its entirety by reference.

When operating in full-bridge mode, the input bridge 102 is operated as a full H-bridge where the diagonals of the input bridge 102 are alternately activated/deactivated 180° out of phase at the switching frequency (e.g., 100 kHz). When operating in half-bridge mode, the peak-to-peak output voltage from the bridge 102 is reduced from 2Vin to Vin without requiring changes to the operating frequency of the bridge 102. Additionally, given that the capacitance of the output bridge 150 (relative to the input side) is generally considerably larger than the capacitance of the input bridge 102, at lower power levels the half-bridge mode may be used for larger voltage ratios; as the longer ZVS transitions lead to a lower effective amplitude of the waveforms the input bridge 102 applies a lower total volt-seconds to the tank 104. By switching between half H-bridge and full H-bridge operation of the bridge 102, the output power of the resonant converter 100 can be effectively controlled while minimizing switch losses within the bridge 102.

In one illustrative embodiment, Vin=30 V, Vout=300 V, capacitors 130 and 132 have capacitances of $C_{130}$=10 nF and $C_{132}$=1 nF, respectively, and the transformer turns ratio is 1:n where n=6; in such an embodiment the capacitance of capacitor 132, relative to the input side, is approximately 3.6 times the size of the input side (i.e., 1 nF*6²=36 nF). The relevant parameters Q1, Q2, Qp1 and Qp2 for selecting a bridge operating mode are determined as follows:

$$V1=Vin=30 \text{ V}; \tag{2}$$

$$V2=Vout/n=300/6=50V \tag{3}$$

$$Qp1=V1*Cp1=V1*C_{130}=30V*10 \text{ nF}=300 \text{ nC} \tag{4}$$

$$Qp2=V2*Cp2=V2*(C_{132}*n^2)=50V*(1 \text{ nF}*6^2)=1.8 \text{ uC} \tag{5}$$

where Vout in equation (2) is divided by 6 (i.e., n) to account for the transformer turns ratio; and where $C_{132}$ in equation (4) is multiplied by n² to normalize the capacitance across the transformer 106.

In such an embodiment, the resonant converter 100 may be operated to have an output current Iout of 500 milliamps (mA) and a switching frequency $f_{sw}$ of 200 kHz. As such, the parameters Q1 and Q2 are determined as follows:

$$Q2=Iout/f_{sw}*n=500 \text{ mA}/200 \text{ kHz}=15 \text{ μC}; \tag{6}$$

$$Q1=Q2*V2/V1=15 \text{ μC}*50V/30V=25 \text{ μC}; \tag{7}$$

The ratio of equation (1) is then computed as:

$$(Q1+2Qp1)/(Q2+2Qp2)=(25 \text{ μC}+2*300 \text{ nC})/(15 \text{ μC}+2*1.8 \text{ uC})=1.38 \tag{8}$$

For a threshold of 1.0, since the ratio computed in equation (8) is greater than the threshold, the input bridge 102 will be operated in full-bridge mode.

In some embodiments, the bridge controller 114 may compute the voltage-and-charge-based ratio and compare it to a threshold at a rate the same as the sampling rate of the output voltage sampler 126 (e.g., 50 kHz).

In some embodiments, the capacitor 118 may be charged or discharged in a controlled manner in order to reduce transient effects when switching the input bridge 102 between full H-bridge and half H-bridge operation; this may be done by modulating the duty cycle of the bridge (effectively modulating the DC bias voltage) in order to dampen the transient oscillation of bias voltage. For example, during full H-bridge operation, the capacitor 118 may have an average quasi-zero value, and the capacitor 118 may then be charged in a controlled manner to a value of Vin when the bridge operation is switched to half H-bridge operation. Such control may be done during the transition between full H-bridge and half H-bridge operation; additionally and/or alternatively, the pulse widths may be modulated prior to and/or after the actual mode change.

In one or more alternative embodiments, the resonant converter 100 may interleave two or more power stages and/or switch among a plurality of modes of operation. Energy generated by the resonant converter 100 may be used by one or more appliances and/or may be stored for later use, for example, utilizing batteries, heated water, hydro pumping, $H_2O$-to-hydrogen conversion, or the like.

Figure 2:
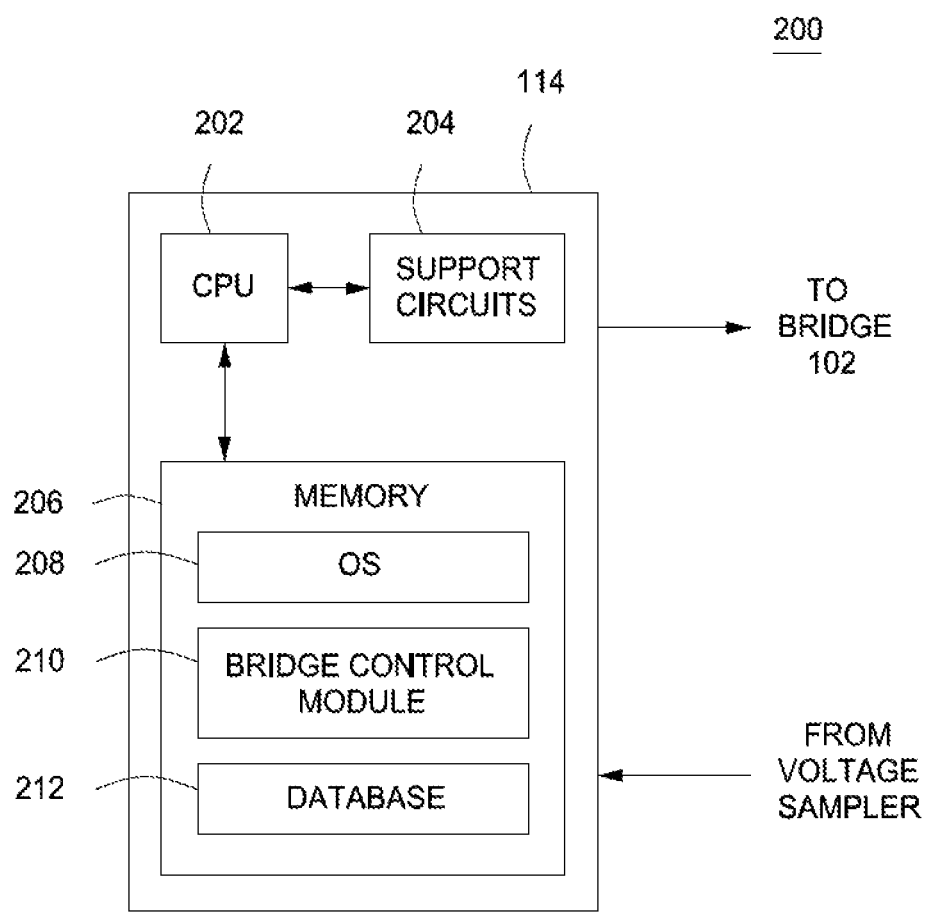
FIG. 2 is a block diagram of a bridge controller in accordance with one or more embodiments of the present invention.

FIG. 2 is a block diagram of a bridge controller 114 in accordance with one or more embodiments of the present invention. The bridge controller 114 comprises support circuits 204 and a memory 206, each coupled to a central processing unit (CPU) 202. The CPU 202 may comprise one or more conventionally available microprocessors or microcontrollers; alternatively, the CPU 202 may include one or more application specific integrated circuits (ASICs). The support circuits 204 are well known circuits used to promote functionality of the CPU 202. Such circuits include, but are not limited to, a cache, power supplies, clock circuits, buses, input/output (I/O) circuits, and the like. The bridge controller 114 may be implemented using a general purpose computer that, when executing particular software, becomes a specific purpose computer for performing various embodiments of the present invention.

The memory 206 may comprise random access memory, read only memory, removable disk memory, flash memory, and various combinations of these types of memory. The memory 206 is sometimes referred to as main memory and may, in part, be used as cache memory or buffer memory. The memory 206 generally stores the operating system (OS)

208, if necessary, of the bridge controller 114 that can be supported by the CPU capabilities. In some embodiments, the OS 208 may be one of a number of commercially available operating systems such as, but not limited to, LINUX, Real-Time Operating System (RTOS), and the like.

The memory 206 stores various forms of application software, such as a bridge control module 210 for controlling operation of the input bridge 102, the output bridge 150 and performing functions related to the present invention. For example, the bridge controller 114 executes the bridge control module 210 to adjust the bridge switching frequency above or below a nominal switching frequency (e.g., 100 kHz) based on output power requirements, to compute a voltage-and-charge-based ratio $(Q1+2Qp1)/(Q2+2Qp2)$, to compare the computed ratio to a threshold, and to operate the bridge 102 as a half H-bridge (i.e., in a half-bridge mode) or full H-bridge (i.e., in a full-bridge mode) based on whether the computed ratio satisfies the threshold. For embodiments where a PV module is coupled at the input of the resonant converter 100, the bridge control module 210 may determine an operating point for biasing the PV module at its MPP and tune the switching frequency of the bridge 102 accordingly to achieve MPP operation. Further detail on the functionality provided by the bridge controller 114 is described below with respect to FIG. 3.

The memory 206 may additionally store a database 212 for storing data related to the operation of the resonant converter 100 and/or the present invention, such as one or more thresholds for comparison to the ratio $(Q1+2Qp1)/(Q2+2Qp2)$.

In other embodiments, the CPU 202 may be a microcontroller comprising internal memory for storing controller firmware that, when executed, provides the controller functionality described below with respect to FIG. 3.

Figure 3:
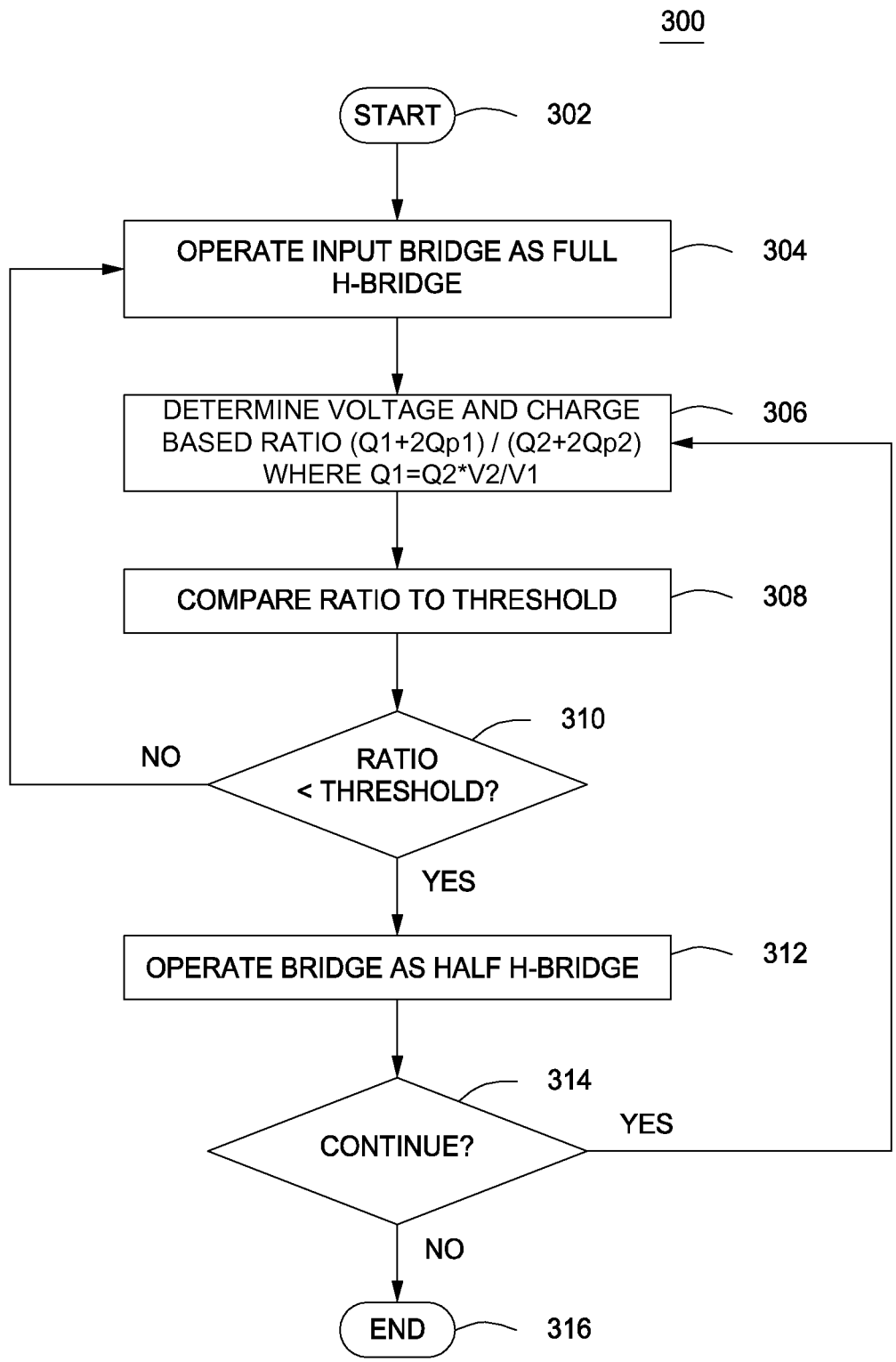
FIG. 3 is a flow diagram of a method for modulating output power from a resonant power converter in accordance with one or more embodiments of the present invention.

FIG. 3 is a flow diagram of a method 300 for modulating output power from a resonant power converter in accordance with one or more embodiments of the present invention. The method 300 is one implementation of the bridge control module 210.

The resonant converter is a DC-AC converter that comprises a full H-bridge at its input (e.g., the resonant converter 100 comprising the input bridge 102), and an output bridge that may be a half-bridge (e.g., the output bridge 150) or a full-bridge. The resonant converter may comprise any type of resonant circuit, e.g., series LC, parallel LC, series-parallel LLC, series-parallel LCC, series-parallel LLCC, or the like. In some embodiments, the resonant converter is coupled to one or more renewable energy sources, such as PV modules, wind farms, hydroelectric systems, or the like, for receiving a DC input voltage. Additionally or alternatively, the resonant converter may be coupled to one or more other sources of DC power, such as a battery.

In one or more alternative embodiments, the resonant converter may comprise an output rectifier in place of the output bridge for generating a DC output. Energy generated by the resonant converter may be used by one or more appliances, coupled to an AC line such as a commercial AC power grid, and/or may be stored for later use, for example, utilizing batteries, heated water, hydro pumping, $H_2O$-to-hydrogen conversion, or the like.

The method 300 begins at step 302 and proceeds to step 304. At step 304, the resonant converter input bridge is operated (e.g., driven by a bridge controller, such as the bridge controller 114) as a full H-bridge at a frequency proximate the resonant frequency of the resonant circuit (e.g., on the order of 100-200 KHz) to convert a DC input voltage Vin to an AC output voltage Vout based on output power requirements. In some embodiments, the resonant converter may be coupled to a PV module for receiving the input voltage Vin, and the resonant converter bridge may be operated at a frequency such that the PV module is biased at an MPP. For example, a bridge controller, such as the bridge controller 114, may determine the appropriate operating frequency for achieving the MPP and operate the bridge accordingly.

The method 300 proceeds to step 306, where a voltage-and-charge-based ratio of $(Q1+2Qp1)/(Q2+2Qp2)$ is determined. The resonant converter may comprise voltage samplers for sampling the input and output voltages (e.g., input voltage sampler 124, output voltage sampler 126) and generating values indicative of the sampled voltages ("voltage samples") for use in determining the voltage-and-charge-based ratio. In some embodiments, the input voltage sampler and the output voltage sampler may perform such sampling at rates of 1 kHz and 50 kHz, respectively. The voltage samples, as well as input and output capacitances, desired output current, switching frequency, may then be used to compute the voltage-and-charge-based ratio as previously described in equations (2)-(8). Such calculations may be performed, for example, at a controller such as the bridge controller 114.

The method 300 proceeds to step 308 where the computed voltage-and-charge-based ratio is compared to a threshold, for example by the bridge controller, where the threshold may be on the order of 1.0. In some embodiments, the ratio may be determined and compared to the threshold at the same rate as the output voltage sampler samples the output voltage (e.g., 50 kHz). At step 310, a determination is made whether the voltage-and-charge-based ratio exceeds the threshold. If the voltage-and-charge-based ratio does exceed the threshold, the method 300 returns to step 304. If the voltage-and-charge-based ratio does not exceed the threshold, the method 300 proceeds to step 312. In some embodiments, if the voltage-and-charge-based ratio is equal to the threshold, the method 300 returns to step 304, while in other embodiments it proceeds to step 312.

At step 312, the input bridge is operated as a half H-bridge (i.e., in half-bridge mode) rather than as a full H-bridge. For example, one switch of the H-bridge (e.g., switch 122-1) may be continuously deactivated which another switch of the H-bridge (e.g., switch 120-2) is continuously activated and the remaining switches (e.g., switches 120-1 and 122-2) are synchronously operated 180° out of phase. Such operation reduces the bridge output voltage by half without requiring changes to the operating frequency of the bridge.

In some embodiments, one or more capacitors within the resonant circuit of the converter may be charged in a controlled manner when switching between full H-bridge and half H-bridge operation in order to reduce transient effects. For example, when operating in a full H-bridge mode, the capacitor 118 within the resonant circuit 104 may have an average quasi-zero value. When switching from full H-bridge to half H-bridge operation, the capacitor 118 may then be charged in a controlled manner to a value of Vin to reduce any transient affects from switching to the half H-bridge operation. This may be done by modulating the duty cycle of the bridge (thereby effectively modulating the DC bias voltage) in order to dampen the transient oscillation of bias voltage. For example, during full H-bridge operation, the capacitor 118 may have an average quasi-zero value, and the capacitor 118 may then be charged in a controlled manner to a value of Vin when the bridge operation is switched to half H-bridge operation. Such control may be done during the transition between full H-bridge and half H-bridge operation; additionally and/or alternatively, the pulse widths may be modulated prior to and/or after the actual mode change.

The method 300 proceeds to step 314, where a decision is made whether to continue operating the resonant converter. If, at step 314, it is decided to continue operation, the method 300 returns to step 306. If, at step 314, it is decided that operation will not continue, the method 300 proceeds to step 316 where it ends. In some embodiments, the voltage-and-charge-based ratio may be computed and compared to a threshold at a rate the same as the sampling rate of a voltage sampler, such as the output voltage sampler 126 (e.g., 50 kHz).

FIG. 4 is a block diagram of a system 400 for power conversion using one or more embodiments of the present invention. This diagram only portrays one variation of the myriad of possible system configurations and devices that may utilize the present invention. The present invention can be utilized in any system or device that uses a resonant converter for converting a DC input power to an output power, such as a DC-DC converter, a DC-AC converter, an AC-AC converter (i.e., as a stage within the AC-AC converter), or the like.

The system 400 comprises a plurality of power converters 402-1, 402-2, 402-3 . . . 402-N, collectively referred to as power converters 402; a plurality of DC power sources 404-1, 404-2, 404-3 . . . 404-N, collectively referred to as DC power sources 404; a controller 406; a bus 408; and a load center 410. The DC power sources 404 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power.

Each power converter 402-1, 402-2, 402-3 . . . 402-N is coupled to a DC power source 404-1, 404-2, 404-3 . . . 404-N, respectively, in a one-to-one correspondence; in some alternative embodiments, multiple DC power sources 404 may be coupled to a single power converter 402. The power converters 402 are coupled to the controller 406 via the bus 408. The controller 406 is capable of communicating with the power converters 402 by wireless and/or wired communication (e.g., power line communication) for providing operative control of the power converters 402. The power converters 402 are further coupled to the load center 410 via the bus 408.

The power converters 402 convert the DC power from the DC power sources 404 to an output power; in some embodiments the output power may be DC output power (i.e., the power converters 402 are DC-DC converters), while in other embodiments the output power may be AC output power (i.e., the power converters 402 are DC-AC converters). The power converters 402 couple the generated output power to the load center 410 via the bus 408. The generated power may then be distributed for use, for example to one or more appliances, and/or the generated energy may be stored for later use, for example using batteries, heated water, hydro pumping, $H_2O$-to-hydrogen conversion, or the like. In some embodiments, the power converters 402 convert the DC input power to AC power that is commercial power grid compliant and couple the AC power to the commercial power grid via the load center 410.

Each of the power converters 402 comprises a resonant converter 100 (i.e., the power converters 402-1, 402-2, 402-3 . . . 402-N comprise the resonant converters 100-1, 100-2, 100-3 . . . 100-N, respectively) utilized in the conversion of the DC input power to the output power. In some embodiments, the resonant converters 100 operate as previously described to convert a DC power (i.e., the DC input power) to an AC output power, where the resonant converter's input bridge is operated as either a full H-bridge or a half H-bridge based on whether the ratio of the equation (1) satisfies a threshold, as previously described.

The foregoing description of embodiments of the invention comprises a number of elements, devices, circuits and/or assemblies that perform various functions as described. For example, the bridge 102 is an example of a means for generating a bipolar square wave voltage from a DC input voltage, and the bridge controller 114 is an example of a means for computing a voltage ratio pertaining to a voltage conversion in a resonant converter; comparing the voltage ratio to a threshold; and controlling, independent of switching frequency of the resonant converter, power output from the resonant converter based on whether the voltage ratio satisfies the threshold. These elements, devices, circuits, and/or assemblies are exemplary implementations of means for performing their respectively described functions.

While the foregoing is directed to embodiments of the present invention, other and further embodiments of the invention may be devised without departing from the basic scope thereof, and the scope thereof is defined by the claims that follow.

The invention claimed is:

1. A method for controlling power conversion by a resonant converter, comprising:
   receiving, at the resonant converter, electrical power for conversion;
   dynamically selecting, during power conversion by the resonant converter, a mode from a plurality of modes for operating an H-bridge of the resonant converter, wherein the plurality of modes comprises a full H-bridge mode and a half H-bridge mode; and
   operating the H-bridge in a mode selected from the plurality of modes, wherein dynamically selecting the mode comprises (i) computing a ratio based on an input voltage to the resonant converter, an output voltage from the resonant converter, and a charge transferred with respect to the H-bridge. and (ii) comparing the ratio to a threshold.

2. The method of claim 1, wherein the H-bridge is operated in the half H-bridge mode when the ratio is less than the threshold, and wherein the H-bridge is operated in the full H-bridge mode when the ratio is greater than the threshold.

3. The method of claim 1, further comprising controlling, when switching the H-bridge between operating in the full H-bridge mode and the half-H bridge mode, a charge of a capacitor of a resonant circuit of the resonant converter.

4. The method of claim 1, wherein the H-bridge is an input bridge of the resonant converter and the charge transferred with respect to the H-bridge is transferred into or out of the input bridge, and wherein the ratio is further based on (i) a charge transferred with respect to an output bridge of the resonant converter, (ii) a required charge for switching the input bridge, and (iii) a required charge for switching the output bridge.

5. The method of claim 3, wherein the charge of the capacitor is controlled by modulating a duty cycle of the H-bridge.

6. The method of claim 4, wherein the required charge for switching the input bridge is a normalized charge ($Qp1$) required to zero-voltage switch the input bridge, and wherein the required charge for switching the output bridge is a normalized charge (Qp2) required to zero-voltage switch the output bridge.

7. An apparatus for power conversion by a resonant converter, comprising:
a bridge controller, coupled to an H-bridge of the resonant converter, for (a) dynamically selecting, during power conversion by the resonant converter, a mode from a plurality of modes for operating the H-bridge, wherein the plurality of modes comprises a full H-bridge mode and a half H-bridge mode; and (b) operating the H-bridge in a mode selected from the plurality of modes, wherein the bridge controller dynamically selects a mode from the plurality of modes b (i) computing in a ratio based on an input voltage to the resonant converter, an output voltage from the resonant converter, and a charge transferred with respect to the H-bridge, and (ii) comparing the ratio to a threshold.

8. The apparatus of claim 7, wherein the H-bridge is operated in the half H-bridge mode when the ratio is less than the threshold, and wherein the H-bridge is operated in the full H-bridge mode when the ratio is greater than the threshold.

9. The apparatus of claim 7, wherein the bridge controller controls, when switching the H-bridge between operating in the full H-bridge mode and the half-H bridge mode, a charge of a capacitor of a resonant circuit of the resonant converter.

10. The apparatus of claim 7, wherein the H-bridge is an input bridge of the resonant converter and the charge transferred with respect to the H-bridge is transferred into or out of the input bridge, and wherein the ratio is further based on (i) a charge transferred with respect to an output bridge of the resonant converter, (ii) a required charge for switching the input bridge, and (iii) a required charge for switching the output bridge.

11. The apparatus of claim 9, wherein the charge of the capacitor is controlled by modulating a duty cycle of the H-bridge.

12. The apparatus of claim 10, wherein the required charge for switching the input bridge is a normalized charge (Qp1) required to zero-voltage switch the input bridge, and wherein the required charge for switching the output bridge is a normalized charge (Qp2) required to zero-voltage switch the output bridge.

13. A system for power conversion, comprising:
a photovoltaic (PV) module; and
a resonant converter, coupled to the PV module for converting input power from the PV module to output power, wherein the resonant converter comprises an H-bridge and a bridge controller, coupled to the H-bridge, for (a) dynamically selecting, during power conversion by the resonant converter, a mode from a plurality of modes for operating the H-bridge, wherein the plurality of modes comprises a full H-bridge mode and a half H-bridge mode; and (b) operating the H-bridge in a mode selected from the plurality of modes, wherein the bride controller dynamically selects a mode from the plurality of modes by (i) computing a ratio based on an input voltage to the resonant converter, an output voltage from the resonant converter, and a charge transferred with respect to the H-bridge, and (ii) comparing the ratio to a threshold.

14. The system of claim 13, wherein the H-bridge is operated in the half H-bridge mode when the ratio is less than the threshold, and wherein the H-bridge is operated in the full H-bridge mode when the ratio is greater than the threshold.

15. The system of claim 13, wherein the bridge controller controls, when switching the H-bridge between operating in the full H-bridge mode and operating in the half-H bridge mode, a charge of a capacitor of a resonant circuit of the resonant converter, and wherein the charge of the capacitor is controlled by modulating a duty cycle of the H-bridge.

16. The system of claim 13, wherein the H-bridge is an input bridge of the resonant converter and the charge transferred with respect to the H-bridge is transferred into or out of the input bridge, and wherein the ratio is further based on (i) a charge transferred with respect to an output bridge of the resonant converter, (ii) a required charge for switching the input bridge, and (iii) a required charge for switching the output bridge.

17. The system of claim 16, wherein the required charge for switching the input bridge is a normalized charge (Qp1) required to zero-voltage switch the input bridge, and wherein the required charge for switching the output bridge is a normalized charge (Qp2) required to zero-voltage switch the output bridge.

* * * * *